(12) United States Patent
Xiao et al.

(10) Patent No.: US 9,467,998 B2
(45) Date of Patent: Oct. 11, 2016

(54) SYSTEM AND METHOD FOR COORDINATED TRANSMISSION

(71) Applicant: FutureWei Technologies, Inc., Plano, TX (US)

(72) Inventors: Weimin Xiao, Hoffman Estates, IL (US); Jialing Liu, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 534 days.

(21) Appl. No.: 13/646,498

(22) Filed: Oct. 5, 2012

(65) Prior Publication Data

US 2013/0088986 A1 Apr. 11, 2013

Related U.S. Application Data

(60) Provisional application No. 61/543,674, filed on Oct. 5, 2011.

(51) Int. Cl.
*H04L 1/00* (2006.01)
*H04W 72/04* (2009.01)
(Continued)

(52) U.S. Cl.
CPC ......... *H04W 72/0426* (2013.01); *H04B 7/024* (2013.01); *H04B 7/0456* (2013.01); *H04W 72/044* (2013.01); *H04W 72/1278* (2013.01)

(58) Field of Classification Search
CPC ............................ H04W 84/045; H04B 7/024
USPC ......................................................... 370/252
See application file for complete search history.

(56) References Cited

U.S. PATENT DOCUMENTS 5,917,812 A 6/1999 Antonio et al.
8,639,256 B2 * 1/2014 Garavaglia et al. .......... 455/447

(Continued)

FOREIGN PATENT DOCUMENTS

CN 1219310 A 6/1999
CN 102065434 A 5/2011

OTHER PUBLICATIONS

International Search Report and Written Opinion of Patent Cooperation Treaty (PCT), International Application No. PCT/US12/59130, Applicant Huawei Technologies Co., Ltd., date of mailing Dec. 24, 2012, 10 pages.

(Continued)

*Primary Examiner* — Mark Rinehart
*Assistant Examiner* — Matthew Hopkins
(74) *Attorney, Agent, or Firm* — Futurewei Technologies, Inc.

(57) ABSTRACT

A method for operating a first communications controller serving a first device includes receiving channel information for a communications channel between the first communication controller and a second device served by a second communications controller, and determining a time-frequency resource, a duration, and a precoding constraint in accordance with the received channel information, the time-frequency resource, the duration, and the precoding constraint for use with a transmission of the first communications controller occurring within the time-frequency resource for the duration to reduce interference to a third device served by the second communications controller. The method also includes transmitting coordinated transmission information about the time-frequency resource, the duration, and the precoding constraint, to the second communication controller, and transmitting to the first device in accordance with the precoding constraint, the time-frequency resource, and the duration.

28 Claims, 11 Drawing Sheets

(51) Int. Cl.
*H04B 7/02* (2006.01)
*H04B 7/04* (2006.01)
*H04W 72/12* (2009.01)

(56) References Cited

U.S. PATENT DOCUMENTS

| | | | |
|---|---|---|---|
| 8,855,000 B2* | 10/2014 | Mallik et al. | 370/252 |
| 2009/0034427 A1 | 2/2009 | Sohn et al. | |
| 2009/0197631 A1 | 8/2009 | Palanki et al. | |
| 2009/0227263 A1 | 9/2009 | Agrawal et al. | |
| 2011/0081865 A1 | 4/2011 | Xiao et al. | |
| 2011/0085610 A1* | 4/2011 | Zhuang | H04L 5/0037 375/260 |
| 2011/0098054 A1* | 4/2011 | Gorokhov et al. | 455/452.1 |
| 2011/0223949 A1 | 9/2011 | Lee et al. | |
| 2011/0255486 A1* | 10/2011 | Luo et al. | 370/329 |
| 2012/0039251 A1* | 2/2012 | Sayana et al. | 370/328 |
| 2013/0235842 A1 | 9/2013 | Jia et al. | |

OTHER PUBLICATIONS

Chinese Search Report received in Application No. 2012800490207 mailed Jan. 16, 2015, 2 pages.
Chinese Office Action received in Application No. 201280049020.7 mailed Jan. 26, 2015, 7 pages.
Botella, C., et al., "Definitions and architecture requirements for supporting interference avoidance techniques," Advanced Radio Interface Technologies for 4G Systems ARTIST4G, 247223, D1.1_v2.0.doc, Dec. 30, 2010, 34 pages.
The Partial Supplementary European Search Report, Application No. 12838090.4, Huawei Technologies, Co., Ltd., Nov. 20, 2014, 8 pages.
Hunukumbure, M., et al., "Efficient MIMO downlink intercell interference cancellation using pre-coding," IEEE 802.16 Broadband Wireless Access Working Group, IEEE C802.16m-08/449, May 2, 2008, 6 pages.
"Interference Management for Broadband Transmission with Antenna Port 5," Hitachi, Ltd., 12.3. Coordinated Multipoint Transmission/Reception (COMP), R1-090068, Jan. 12-16, 2009, 3 pages, 3GPP TSG RAN WG1 #55bis, Ljubljana, Slovenia.
"Performance of DL Coordinated Beam Switching Under Varying Traffic Loads," Huawei, 15.2, R1-091797, May 4-8, 2009, 9 pages, 3GPP TSG RAN WG1 Meeting #57, San Francisco, CA.
Sigdel, S., et al., "Literature Survey Report on State-of-Art of Radio Resource Management Techniques and Algorithms for DL CoMP/Network MIMO," Sep. 29, 2010, 24 pages.
"Full Buffer Performance Evaluation of DL CS/CB in Scenarios 3 and 4," Huawei, HiSilicon, 6.5.1, R1-112038, Aug. 22-26, 2011, 12 pages, 3GPP TSG-RAN WG1 Meeting #66, Athens, Greece.
3GPP TSG RAN WG1 #59bis Meeting R1-10-0420, "Consideration on performance of coordinated beamforming with PMI feedback", Alcatel et al., Jan. 18-22, 2010, total 8 pages.

* cited by examiner

SYSTEM AND METHOD FOR COORDINATED TRANSMISSION

This application claims the benefit of U.S. Provisional Application No. 61/543,674, filed on Oct. 5, 2011, entitled "System and Method for Coordinated Beam Blanking," which application is hereby incorporated herein by reference.

TECHNICAL FIELD

The present disclosure relates generally to digital communications, and more particularly to a system and method for coordinated transmission.

BACKGROUND

Typically, in a modern wireless communications system, a plurality of cells or evolved NodeBs (eNB) (also commonly referred to as NodeBs, base stations, base terminal stations, communications controllers, and so on) may be arranged into a cluster of cells, with each cell having multiple transmit antennas. Additionally, each cell or eNB may be serving a number of users (also commonly referred to as User Equipment (UE), mobile stations, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

Usually, the eNBs may be arranged close to each other so that a decision made by a first eNB may have an impact on a second eNB. For example, the eNBs may use their transmit antenna arrays to form beams towards their UEs when serving them. This may mean that if the first eNB decides to serve a first UE in a particular time-frequency resource, it may form a beam pointing to that UE. However, the pointed beam may extend into a coverage area of the second eNB and cause interference to UEs served by the second eNB. The inter-cell interference (ICI) for small cell wireless communications systems is commonly referred to as an interference limited cell scenario, which may be different from a noise limited cell scenario seen in large cell wireless communications systems.

SUMMARY OF THE DISCLOSURE

Example embodiments of the present disclosure which provide a system and method for coordinated transmission.

In accordance with an example embodiment of the present disclosure, a method for operating a first communications controller serving a first device is provided. The method includes receiving, by the first communications controller, channel information for a communications channel between the first communication controller and a second device served by a second communications controller. The method also includes determining, by the first communications controller, a time-frequency resource, a duration, and a precoding constraint in accordance with the received channel information, the time-frequency resource, the duration, and the precoding constraint for use with a transmission of the first communications controller occurring within the time-frequency resource for the duration to reduce interference to a third device served by the second communications controller. The method further includes transmitting, by the first communications controller, coordinated transmission information about the time-frequency resource, the duration, and the precoding constraint, to the second communication controller, and transmitting, by the first communications controller, to the first device in accordance with the precoding constraint, the time-frequency resource, and the duration.

In accordance with another example embodiment of the present disclosure, a method for operating a device is provided. The method includes measuring, by the device, a channel between the device and an interferer, and reporting, by the device, information about the measured channel to a communications controller serving the device. The method further includes receiving, by the device, a transmission from the communications controller in a time-frequency resource during which the interferer causes reduced interference to the device as a result of the interferer applying a precoding constraint derived from the information about the measured channel to a portion of a transmission coverage area shared by the device and the interferer in accordance with the information reported to the communications controller.

In accordance with another example embodiment of the present disclosure, a method for operating a communications controller serving a first device is provided. The method includes receiving, by the communications controller, channel information for a channel between an interferer device and the first device, and deriving, by the communications controller, statistical long-term information for the channel from the channel information. The method also includes reporting, by the communications controller, the statistical long-term information to the interferer device, and receiving, by the communications controller, coordinated transmission information from the interferer device, the coordinated transmission information about a time-frequency resource and a duration when the interferer device will transmit using a precoder adjusted with a precoding constraint derived from the statistical long-term information to modify a portion of a transmission coverage area occupied by the first device to reduce interference to the first device.

In accordance with another example embodiment of the present disclosure, a first communications controller serving a first device is provided. The first communications controller includes a receiver, a processor operatively coupled to the receiver, and a transmitter operatively coupled to the processor. The receiver receives channel information for a communications channel between the first communication controller and a second device served by a second communications controller. The processor determines a time-frequency resource, a duration, and a precoding constraint in accordance with the received channel information, the time-frequency resource, the duration, and the precoding constraint for use with a transmission of the first communications controller occurring within the time-frequency resource for the duration to reduce interference to a third device served by the second communications controller. The transmitter transmits coordinated transmission information about the time-frequency resource, the duration, and the precoding constraint, to the second communication controller, and to transmit to the first device in accordance with the precoding constraint, the time-frequency resource, and the duration.

In accordance with another example embodiment of the present disclosure, a device is provided. The device includes a processor, and a receiver operatively coupled to the processor. The processor measures a channel between the device and an interferer, and reports information about the measured channel to a communications controller serving the device. The receiver receives a transmission from the communications controller, the device experiences reduced interference from the interferer as a result of the interferer applying a precoding constraint derived from the information about the measured channel to a portion of a transmission coverage area shared by the device and the interferer in accordance with the information reported to the communications controller.

In accordance with another example embodiment of the present disclosure, a communications controller serving a first device is provided. The communications controller includes a receiver, and a processor operatively coupled to the receiver. The receiver receives channel information for a channel between an interferer device and the first device, and receives coordinated transmission information from the interferer device, the coordinated transmission information about a time-frequency resource and a duration when the interferer device will transmit using a precoder adjusted with a precoding constraint derived from statistical long-term information to modify a portion of a transmission coverage area occupied by the first device to reduce interference to the first device. The processor derives the statistical long-term information for the channel from the channel information, and reports the statistical long-term information to the interferer device.

In accordance with another example embodiment of the present disclosure, a method for reducing interference by a first communications controller serving a first device is provided. The method includes selecting a transmitter configuration in accordance with channel information of an interference channel between the first communications controller and a second device operating in a coverage area of the first communications controller, the second device served by a second communications controller, and the transmitter configuration selected to reduce interference to the second device from a transmission made by the first communications controller. The method also includes transmitting to the first device in accordance with the selected transmitter configuration.

One advantage of an embodiment is that a fast (e.g., low latency) exchange of large amounts of coordination information is not required. Therefore, bandwidth and latency requirements on a backhaul are relatively small, enabling the use of a less capable backhaul and reducing implementation costs.

A further advantage of an embodiment is that a macro-cell is always able to transmit, increasing utilization of the communications system and its resources.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
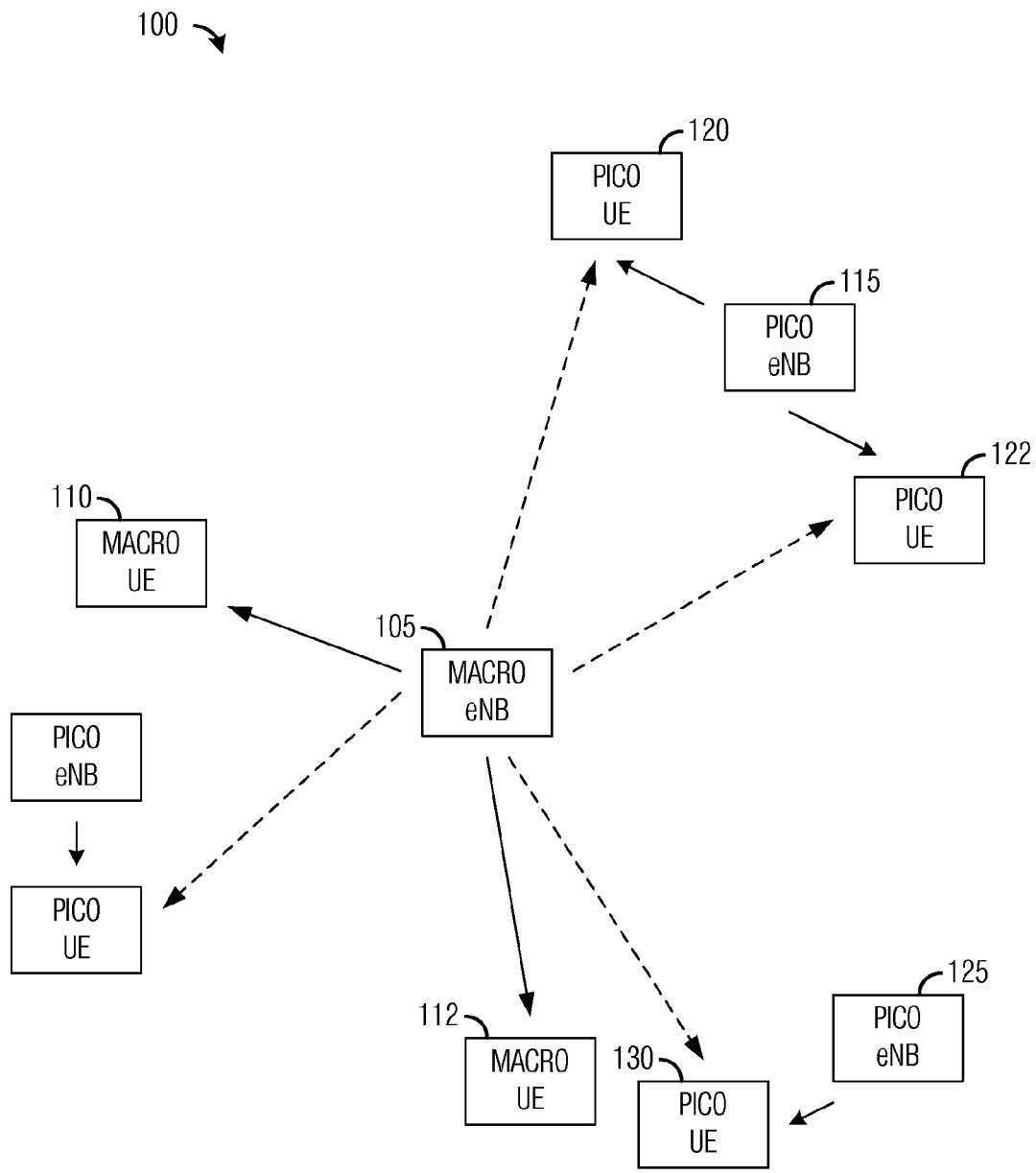
FIG. 1 illustrates an example communications system according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to coordinated transmissions. For example, at a first communications controller serving a first UE, the first communications controller receives channel information for a communications channel between the first communication controller and a second device served by a second communications controller, and determines a time-frequency resource, a duration, and a precoding constraint in accordance with the received channel information, the time-frequency resource, the duration, and the precoding constraint for use with a transmission of the first communications controller occurring within the time-frequency resource for the duration to reduce interference to a third device served by the second communications controller. The first communications controller transmits coordinated transmission information about the time-frequency resource, the duration, and the precoding constraint, to the second communication controller, and transmits to the first device in accordance with the precoding constraint, the time-frequency resource, and the duration.

As another example, at a device, the device measures a channel between the device and an interferer, and reports information about the measured channel to a communications controller serving the device. The device receives a transmission from the communications controller in a time-frequency resource during which the interferer causes reduced interference to the device as a result of the interferer applying a precoding constraint derived from the information about the measured channel to a portion of a transmission coverage area shared by the device and the interferer in accordance with the information reported to the communications controller As yet another example, at a communications controller serving a first device, the communications controller receives channel information for a channel between an interferer device and the first device, and derives statistical long-term information for the channel from the channel information. The communications controller reports the statistical long-term information to the interferer device, and receives coordinated transmission information from the interferer device, the coordinated transmission information about a time-frequency resource and a duration when the interferer device will transmit using a precoder adjusted with a precoding constraint derived from the statistical long-term information to modify a portion of a transmission coverage area occupied by the first device to reduce interference to the first device.

The present disclosure will be described with respect to example embodiments in a specific context, namely a heterogeneous communications system supporting full power cells as well as low power cells that are distributed throughout the heterogeneous communications system. The disclosure may also be applied, however, to other standards and non-standards compliant communications system that are homogeneous or heterogeneous.

The amount and type of interference that a first eNB causes to UEs in the coverage area of a second eNB may depend on which UE the first eNB chooses to schedule in a particular time-frequency resource and on which precoding matrix/vector (or simply, precoder) it decides to use. A time-frequency resource may be a transmission unit of the communications system. It may be a frequency band and/or a frame (or subframe) in which a transmission occurs. As an example, a time-frequency resource may a 20 MHz frequency band, a plurality of frequency bands, a subframe with a 10 milli-second duration, a plurality of subframes, or a combination thereof. Usually and until recently, each eNB may independently make such scheduling/precoding decisions and hence the UEs may experience (sometimes significant) interference fluctuations.

In a commonly used solution, an eNB may apply a safety back off margin to a reported channel quality indicator (CQI) message from a UE to its serving eNB in order to deal with the interference fluctuations seen by the UEs but are unknown to the eNB. The eNB may then use the backed off version of the CQI to perform link adaptation and select a modulation and coding selection (MCS) level thereon. Another commonly used solution may be for either the eNB or the UE to average several measured CQIs in order to average out the CQI fluctuations. Alternatively, coordination between cells may be used to reduce the amount of interference as well as interference fluctuations.

It is noted that the discussion presented above focuses on full power cells that are typically part of a planned network infrastructure designed by an operator of a communications system. The full power cells may be referred to as macro-cells or macro-eNBs. However, in a heterogeneous communications system, there may be several additional types of cells operating in conjunction with the macro-cells. These additional types of cells usually differ from the macro-cells in their maximum allowable transmit power level, and are commonly referred to as low power cells. Furthermore, some low power cells may be installed and/or operated by users of the heterogeneous communications system looking to improve coverage, performance, and the like, for their UE. While others may be installed and operated by the operator to provide coverage within coverage holes or high traffic areas, such as shopping malls, air ports, hotels, and the like. Examples of low power cells include pico cells, femto cells, remote radio heads (RRH), and the like. The low power cells may commonly be referred to as low power nodes (LPN). Example embodiments presented herein are applicable to multiple types of cells.

FIG. 1 illustrates a communications system 100. Communications system 100 is an example of a heterogeneous communications system with full power cells (e.g., macro eNB 105) as well as low power cells (e.g., pico eNB 115 and pico eNB 125). The cells (referring to both full power cells and low power cells) serve UEs. As an example, macro eNB 105 is serving macro UE 110 and macro UE 112, while pico eNB 115 is serving pico UE 120 and pico UE 122 and pico eNB 125 is serving pico UE 130.

While it is understood that communications systems may employ multiple eNBs capable of communicating with a number of UEs, only one macro eNB, three pico eNBs, and a number of UEs are illustrated for simplicity. In general, the term device may be used to generically refer to communications devices, such as UEs, subscribers, terminals, and the like, as well as network entities, such as full power cells, low power cells, RRH, relay nodes, and the like.

Since a full power cell (e.g., macro eNB 105) may transmit at a high power level, transmissions made by the full power cell to one of its UEs may cause interference at a UE served by a different eNB (e.g., pico eNB 115, pico eNB 125, and/or another macro eNB). As an example, a transmission from macro eNB 105 to macro UE 112 may cause interference at pico eNB 130.

Figure 2:
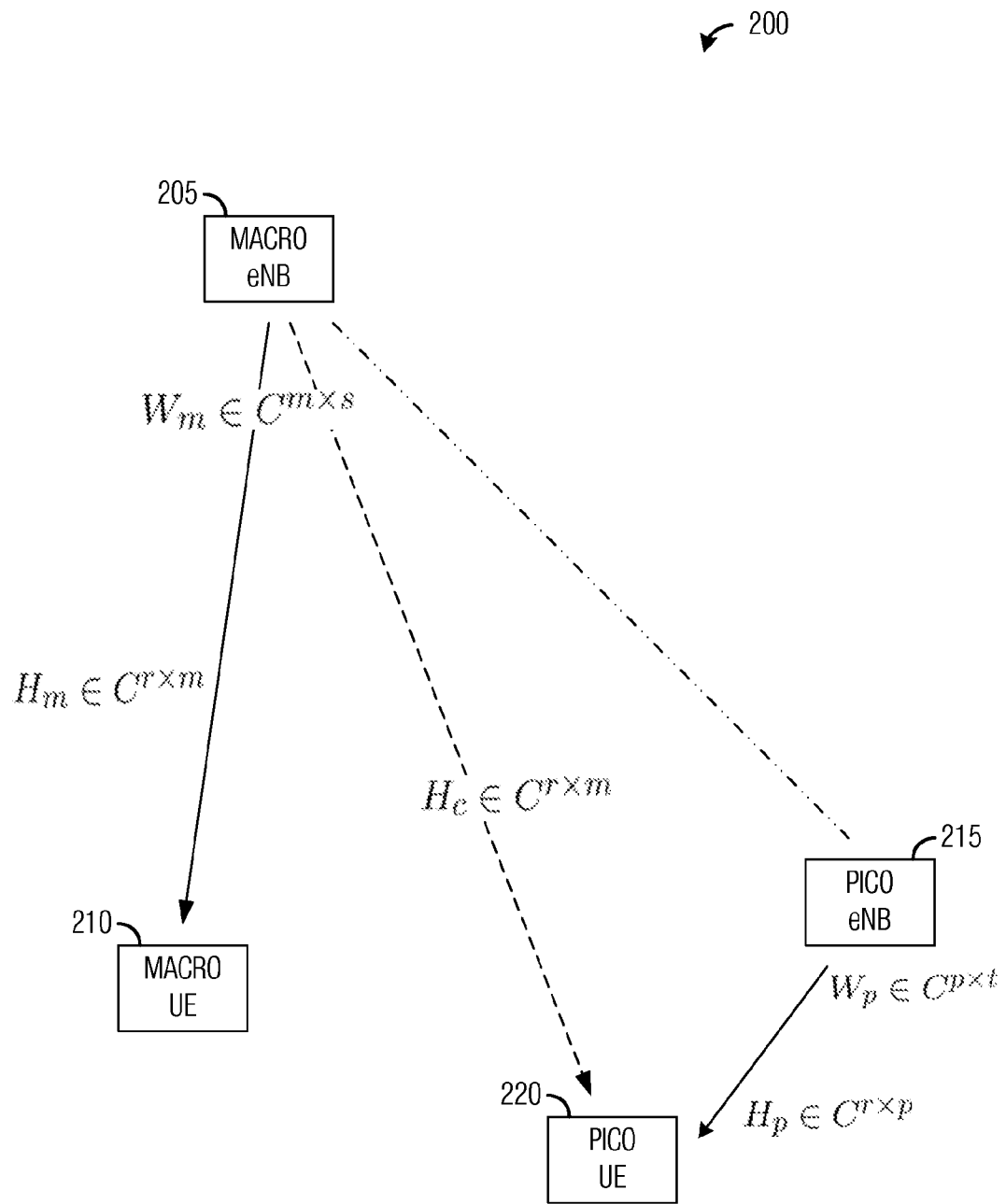
FIG. 2 illustrates an example portion of a communications system highlighting a representation of transmissions as well as interference between various communicating devices according to example embodiments described herein.

FIG. 2 illustrates a portion of communications system 200 highlighting a representation of transmissions as well as interference between various communicating devices. Communications system 200 includes a macro eNB 205 that is serving macro UE 210. Communications system 200 also includes a pico eNB 215 that is serving pico UE 220. As shown in FIG. 2, macro eNB 205 transmits to macro UE 210, while pico eNB 215 transmits to pico UE 220.

A channel between macro eNB 205 and macro UE 210 denoted $H_m$ may be expressed as $H_m \in C^{r \times m}$. A channel between pico eNB 215 and pico UE denoted $H_p$ may be expressed as $H_p \in C^{p \times t}$. A transmission from macro eNB 205 to macro UE 210 may be precoded with a precoder denoted $W_m$ expressible as $W_m \in C^{m \times s}$. A transmission from pico eNB 215 to pico UE 220 may be precoded with a precoder denoted $W_p$ expressible as $W_p \in C^{p \times t}$. However, a transmission between macro eNB 205 and macro UE 210 may also be received at pico UE 220 as interference. A channel between macro eNB 205 and pico UE 220 denoted $H_c$ may be expressed as $H_c \in C^{r \times m}$.

Since macro eNBs, such as macro eNB 205, typically transmit at full power, they are dominant interferers (or equivalently, aggressors) in a communications system, such as communications system 200. The interference arising from transmissions of macro eNBs may be especially detrimental to a pico UE that is operating at an edge of a coverage area of a pico eNB. These pico UEs may be referred to as cell edge pico UEs. A macro eNBs may perform interference avoidance in a spatial domain towards pico UEs, especially cell edge pico UEs, of pico eNBs that are operating within its coverage area. This form of interference avoidance may be referred to as coordinated transmission (CT).

According to an example embodiment, to perform CT, a macro eNB may use relevant statistical long-term information, such as long-term channel state information (CSI), related to its interference towards a pico UEs. As an example, the macro eNB may use the statistical long-term information to adjust the precoder that it uses to transmit. Pico eNB may take advantage of resource-restricted measurements to schedule transmissions in time-frequency resources when the macro eNB is performing CT.

Figure 3A:
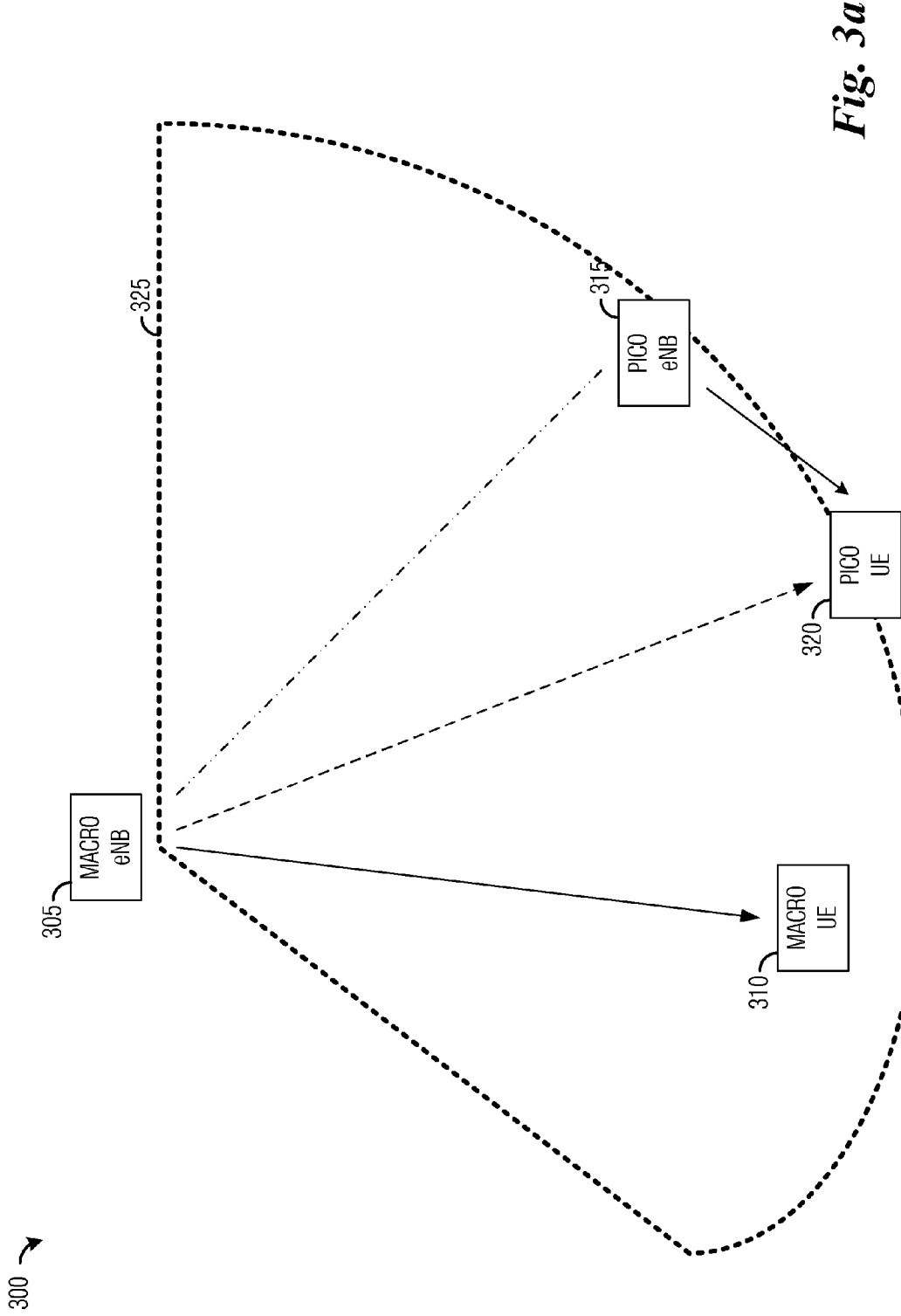
FIG. 3a illustrates an example portion of a communications system wherein coordinated transmission (CT) is not being used by a macro eNB according to example embodiments described herein.

FIG. 3a illustrates a portion of a communications system 300 wherein CT is not being used by a macro eNB 305. Communications system 300 includes macro eNB 305 serving a macro UE 310, as well as a pico eNB 315 serving pico UE 320. Pico UE 320 may be operating within a coverage area of macro eNB 305, shown as region 325. It is noted that region 325 may be a portion of the coverage area of macro eNB 305 and that the actual coverage area of macro eNB 305 may be different.

Macro UE 310 and pico UE 320 are relatively close to each other, so a transmission from macro eNB 305 to macro UE 310 may be received at pico UE 320 in the form of interference. Due to the high transmit power of macro eNB 305, the interference caused to pico UE 320 may be significant.

Figure 3B:
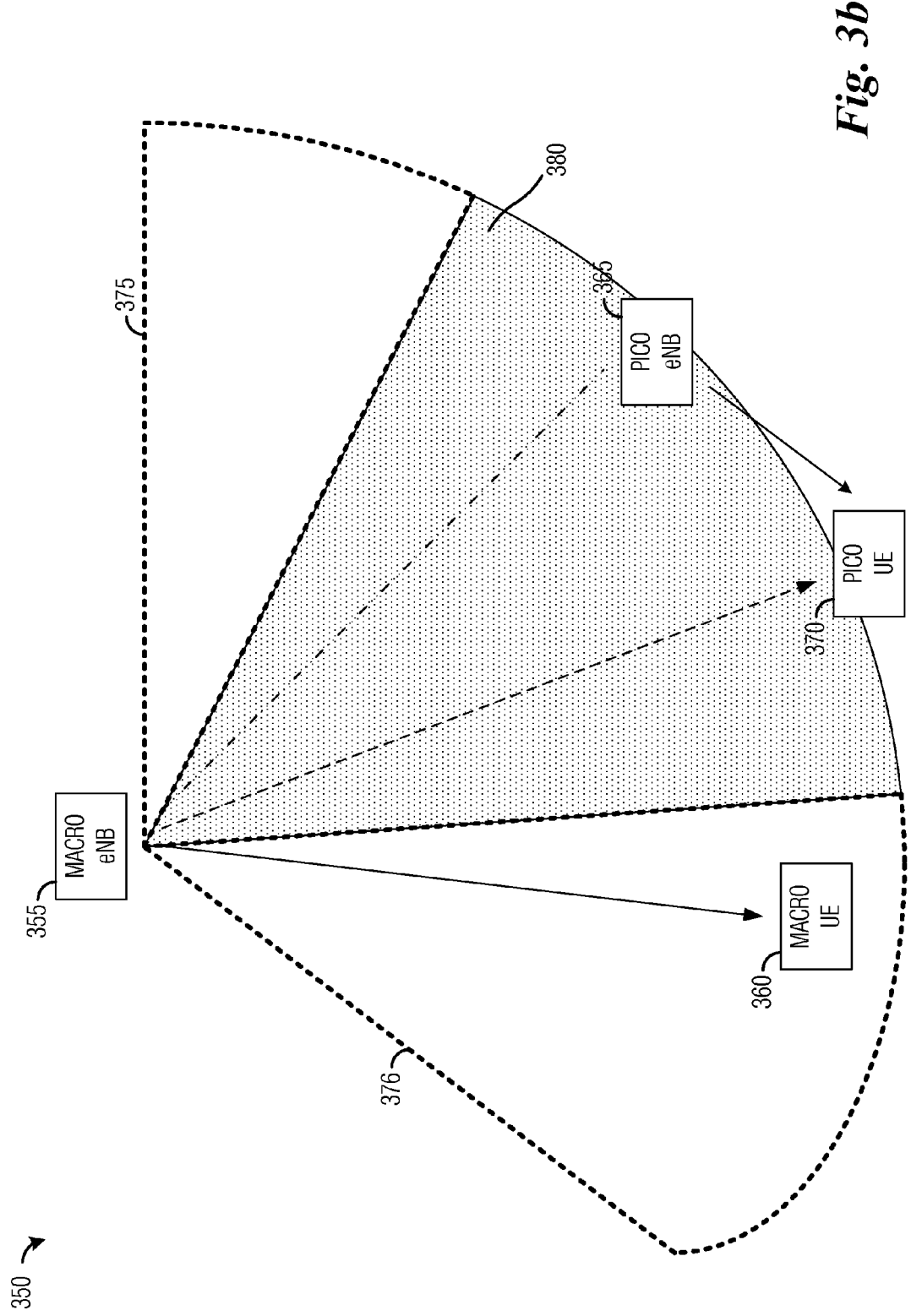
FIG. 3b illustrates an example portion of a communications system wherein CT is being used by a macro eNB according to example embodiments described herein.

FIG. 3b illustrates a portion of a communications system 350 wherein CT is being used by a macro eNB 355. Communications system 350 includes macro eNB 355 serving a macro UE 360, as well as a pico eNB 365 serving pico UE 370. Pico UE 370 may be operating within a coverage area of macro eNB 355. However, macro eNB 355 is using CT and it has adjusted its precoder to blank out a portion of its coverage area so that pico UE 370 is not in its coverage area, shown in FIG. 3b as regions 375 and 376. It is noted that regions 375 and 376 may be a portion of the coverage area of macro eNB 355 and that the actual coverage area of macro eNB 355 may be different. The blanking out of the portion of the coverage area (shown in FIG. 3b as region 380) of macro eNB 355 may help to reduce or eliminate interference to pico UE 370 arising from the transmission to macro UE 360.

According to an example embodiment, macro eNB 355 may make use of statistical long-term information, such as long-term CSI, measured by pico UE 370 and provided by pico eNB 365, to adjust its precoder. It is noted that if there are additional pico UEs operating within the coverage area of macro eNB 355, statistical long-term information measured by a subset of the additional pico UEs may be used by macro eNB 355 to adjust its precoder. As an illustrative example, if there is an additional pico UE operating in region 375, macro eNB 355 may adjust its precoder to eliminate region 375 to reduce interference to the additional pico UE.

It is also noted that if there are multiple pico UEs operating within the coverage area of macro eNB 355, macro eNB 355 may adjust its coverage area over different time-frequency resources to give the multiple pico UEs an opportunity to operate in a low interference environment. Instead of adjusting its precoder to accommodate every pico UE at every time-frequency resource, macro eNB 355 may elect to adjust its precoder to accommodate a first subset of the pico UEs in a first time-frequency resource, adjust its precoder again to accommodate a second subset of pico UEs in a second time-frequency resource, adjust its precoder yet again to accommodate a third subset of pico UEs in a third time-frequency resource, and so on. Macro eNB 355 may have some time-frequency resources where it does not adjust its precoder to accommodate any pico UE.

Figure 4:
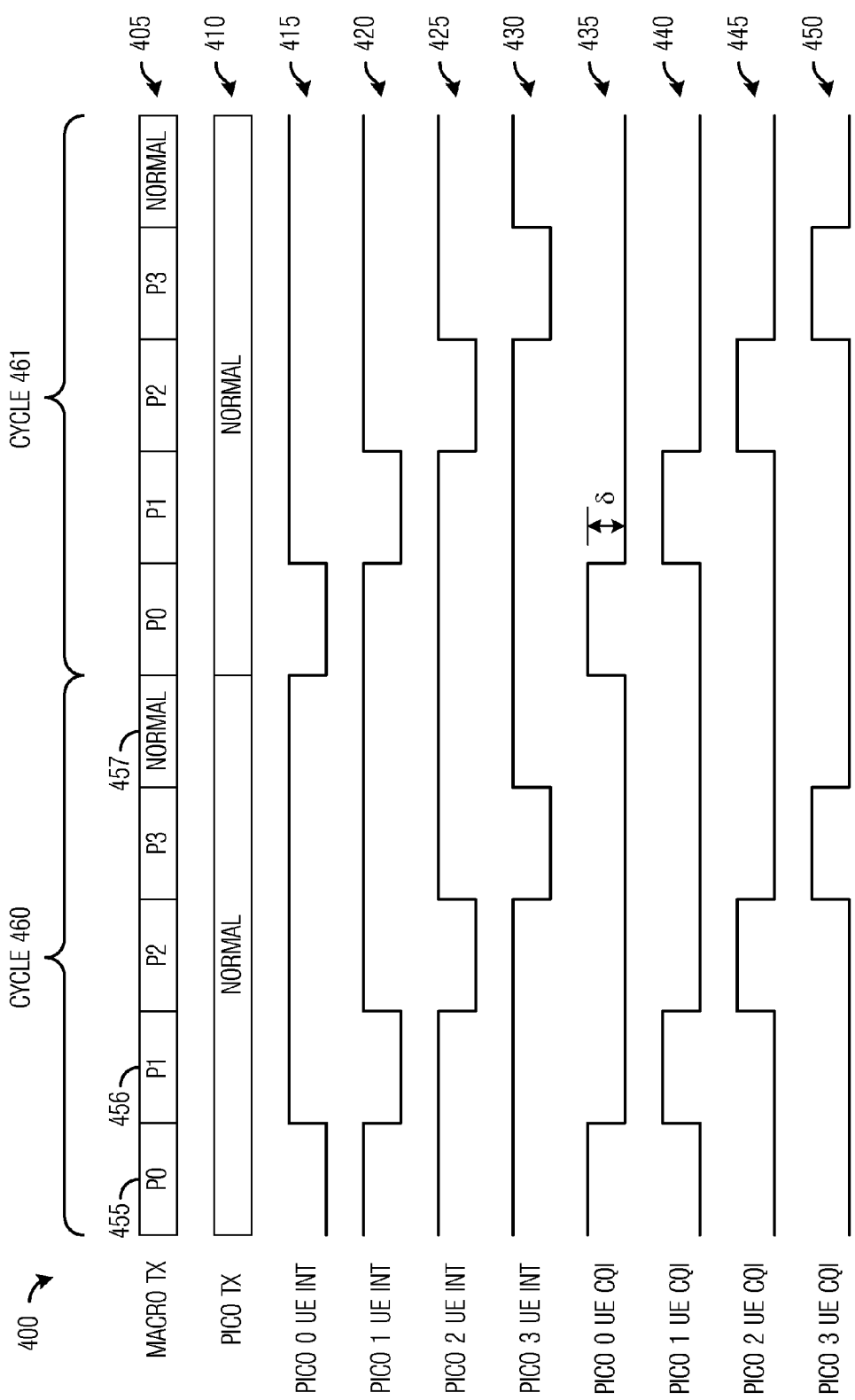
FIG. 4 illustrates an example diagram of transmissions, interference, and statistical long-term information, e.g., channel quality indicator (CQI), in a communications system according to example embodiments described herein.

FIG. 4 illustrates a diagram 400 of transmissions, interference, and statistical long-term information, e.g., channel quality indicator (CQI), in a communications system. As shown in FIG. 4, diagram 400 highlights transmissions of a macro eNB over time (trace 405), transmissions of a pico eNB over time (trace 410), interference at multiple pico UEs over time (traces 415 through 430), and CQI at multiple pico UEs over time (traces 435 through 450). It is noted that CQI at the pico UEs (as shown in traces 435 through 450) may be measured by the individual pico UEs during a resource restricted mode or interval.

The macro eNB is configured to adjust its precoder to avoid interference to a pico UE in each time-frequency resource. As shown in trace 405, at a first time-frequency resource 455, the macro eNB adjusts its precoder to avoid a first pico UE (pico UE 0) with first time-frequency resource 455 labeled "P0." Correspondingly, interference at the first pico UE during first time-frequency resource 455 is low as shown in trace 415 and CQI is high as shown in trace 435. Similarly, at a second time-frequency resource 456, the macro eNB adjusts its precoder to avoid a second pico UE (pico UE 1) with second time-frequency resource 456 labeled "P1." Correspondingly, interference at the second pico UE during second time-frequency resource 456 is low as shown in trace 420 and CQI is high as shown in trace 440.

Also shown in FIG. 4 is a third time-frequency resource 457 wherein the macro eNB does not adjust its precoder to avoid any pico UEs. Consequently, interference at the pico UEs in third time-frequency resource 457 is high (as shown in traces 415 through 430) and CQI is low (as shown in traces 435 through 450). Furthermore, the macro eNB may repeat its adjustments to the precoder in a periodic manner to provide the pico UEs a consistent opportunity to operate with low interference. As shown in FIG. 4, cycle 460 may include five time-frequency resources where the macro eNB adjusts its precoder to avoid interference to four different pico UEs, while cycle 461 is basically a repeat of cycle 460.

Figure 5:
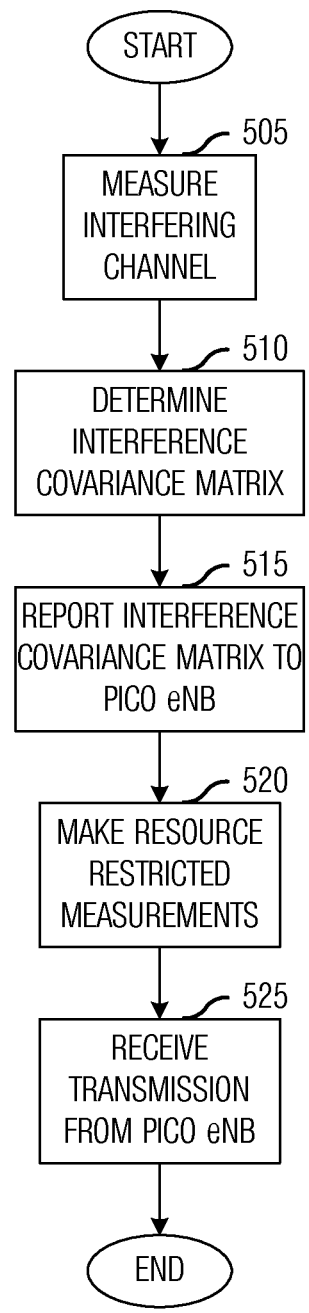
FIG. 5 illustrates an example flow diagram of operations occurring in a pico UE as the pico UE makes measurements and receives a transmission while a macro eNB operates using CT according to example embodiments described herein.

FIG. 5 illustrates a flow diagram of operations 500 occurring in a pico UE as the pico UE makes measurements and receives a transmission while a macro eNB operates using CT. Operations 500 may be indicative of operations occurring at a pico UE as the Pico UE makes channel measurements and receives a transmission from its pico eNB while a macro eNB operates using CT.

Operations 500 may begin with the pico UE, which may be a pico cell edge UE, measures an interfering channel between itself and the macro eNB (block 505). Since the pico eNB often transmits at a significantly lower power level than the macro eNB, as an example, the pico eNB normally transmits at 16 dB lower than the macro eNB, the macro eNB is usually a dominant interferer to the pico UE. The pico UE may measure the interfering channel between itself and the macro eNB using pilot signals or some other reference signal (such as a channel state information reference signal (CSI-RS) or a common reference signal (CRS), or any reduced version, enhanced version, generalized version thereof.) transmitted by the macro eNB.

The pico UE may be configured to measure reference signals transmitted by the macro eNB, and configuration information may be provided by the pico eNB or the macro eNB. As an example, the pico eNB may configure the pico UE to measure on a CSI-RS resource which is associated with the macro eNB. As another example, the macro eNB may configure the pico UE to measure on a CSI-RS resource which is associated with the macro eNB. In either case, the pico UE may be configured to report the channel quality between the macro eNB and the pico UE, a channel (e.g., $H_c$ from FIG. 2) between the macro eNB and the pico UE, the spatial channel statistic information (e.g. interference covariance matrix $R_{ji}$) between the macro eNB and the pico UE, the signal to interference plus noise ratio (SINR) and/or CQI between the macro eNB and the pico UE assuming the macro eNB is serving the pico UE, and/or a precoding matrix indicator (PMI) and/or rank indicator (RI) associated with a CQI report between the macro eNB and the pico UE.

Alternatively, the pico UE may measure the interfering channel using ordinary transmissions made by the macro eNB. The pico UE may also make multiple measurements of the interfering channel over time and combine the multiple measurements. As an example, the pico UE may filter, average, and the like, the multiple measurements. Yet another alternative is that the pico UE may be configured to measure macro eNB interference to the pico UE, and the configuration information may be sent by the pico eNB or the macro eNB. As an example, the pico eNB may configure the pico UE to measure on a channel-state information interference measurement (CSI-IM) resource which is associated with the macro eNB causing interference to the pico UE and the pico eNB possibly muting its own transmission. As another example, the macro eNB may configure the pico UE to measure on a CSI-IM resource which is associated with the macro eNB causing interference the pico UE and the pico eNB possibly muting its own transmission. In either case, the UE may be configured to report the channel (e.g., $H_C$ from FIG. 2) between the macro eNB and the pico UE, or the spatial channel statistic information (e.g., interference covariance matrix $R_{ji}$) between the macro eNB and the pico UE, all based on measurements on the configured CSI-IM resource.

As an illustrative example, the pico eNB may determine that the macro eNB i is its dominant interferer to its pico UEs. The pico eNB may configure each of its pico UEs to measure the interfering channel between the pico UE and macro eNB i. In other words, a pico UE j may obtain an interference covariance matrix (an example of statistical long-term information) expressible as:

$$R_{ji} = \Sigma_k H_{ji}(k)'H_{ji}(k)$$

for each time and/or frequency index k in a subband (block 510). Where $H_{ji}(k)$ is the interfering channel between the pico UE j and macro eNB i associated with the time and/or frequency index k and $H_{ji}(k)'$ is the Hermitian of the interfering channel between the pico UE j and macro eNB i associated with the time and/or frequency index k. If the macro eNB i has t transmit antennas and the pico UE j has r receive antennas, then $H_{ji}(k)$ is a r×t matrix, and $R_{ji}$ is a t×t square matrix. The interference covariance matrix may provide direction information regarding the interference channel between the pico UE and macro eNB i. It is noted that the channel matrix $H_{ji}(k)$ and/or the covariance matrix $R_{ji}$ may be normalized (e.g., to have a unit norm in a certain matrix norm sense), may appropriately incorporate channel strength (such as a coupling loss between the macro eNB and the pico UE), may be appropriately scaled by the long-term channel strength, may be appropriately scaled to generally reflect the long-term channel strength, and the like. The pico UE may report the interference covariance matrix $R_{ji}$ to the pico eNB (block 515). Alternatively, instead of obtaining the interference covariance matrix $R_{ji}$ from the measurements of the interfering channel, the pico UE may report the measurements of the interfering channel (or a function thereof) to the pico eNB.

The pico UE may make resource restricted measurements of the interference received at the pico UE (block 520). The pico eNB may signal the pico UE a subset of time-frequency resources out of a set of time-frequency resources where the pico UE is to make measurements of the interference. Typically the resource restricted measurement pattern sent from the pico eNB to the pico UE is derived by the pico eNB based on a coordination pattern determined by the macro eNB. As an example, the pico eNB may signal the pico UE to make measurements of the interference during subframes 0, 1, 4, 5, 8, 9, and 10 separately from measurements of the interference during subframes 2 and 3, and the like. The pico UE may then derive separate measurements of the interference from each of the two subsets of subframes where it made resource restricted measurements.

As an illustrative example, in subframes 2 and 3, CT is applied toward an area covering the pico UE, and therefore the pico UE will experience reduced interference level from the macro eNB and will be able to derive higher SINR and/or CQI. On other subframes when CT is not applied toward an area covering the pico UE, the pico UE will experience normal interference level (i.e., higher than the reduced interference level) from the macro eNB and will be able to derive lower SINR and/or CQI. It is noted that the difference in SINR and/or CQI is shown in FIG. 4 as δ. When the pico eNB receives both CQI reports from the pico UE, the pico eNB may use the reports (i.e., the CQI reports) with higher SINR and/or CQI to schedule and assign resources for the pico UE during subframes 2 and 3, and use the reports with lower SINR and/or CQI to schedule and assign resources for the pico UE during other subframes (e.g., subframes 0, 1, 4, 5, 8, 9, and/or 10). Typically, the larger the difference between the SINR and/or CQIs, the greater the benefit that the pico UE can receive from the use of CT.

The pico UE may receive a transmission from the pico eNB in a time-frequency resource which corresponds to a time-frequency resource where the macro eNB is performing CT and has adjusted its precoder to blank out a portion of its coverage area to reduce interference to the pico UE (block 525). As an example, if due to the measurements of the interfering channel made by the pico UE, the macro eNB blanks out a portion of its coverage area that includes the pico UE (in other words, the pico UE shares the coverage area with the macro eNB) to reduce interference to the pico UE at a specific time-frequency resource, then the pico UE may receive a transmission from the pico eNB during that specific time-frequency resource, and this received transmission is associated with reduced interference and hence high SINR and/or CQI. The pico UE may also receive a transmission from the pico eNB in a time-frequency resource which corresponds to a time-frequency resource where the macro eNB is not performing CT to blank out a portion of its coverage area to reduce interference to the pico UE. As an example, the macro eNB blanks out a portion of its coverage area that includes a second pico UE at a specific time-frequency resource but the first pico UE does not experience any reduced interference from the macro eNB, or the macro eNB performs normal transmission without any blanking at all, then the pico UE may receive a transmission from the pico eNB during that specific time-frequency resource, and this received transmission is associated with normal interference levels and hence normal SINR and/or CQI.

Instead of reporting the interference covariance matrix $R_{ji}$ (or the measurements of the interfering channel or a function thereof) to the pico eNB, the pico UE may perform eigenvalue decomposition on the interference covariance matrix $R_{ji}$ and report the eigenvector(s) and/or the eigenvalue(s). As an example, the pico UE may report the dominant eigenvector and possibly the dominant eigenvalue. It is noted that if all eigenvectors and eigenvalues are reported, it is similar to reporting the interference covariance matrix $R_{ji}$.

Instead of reporting the interference covariance matrix $R_{ji}$ (or the measurements of the interfering channel or a function thereof) to the pico eNB, the pico UE may directly report to the macro eNB. In a situation where the pico UE has direct connection with multiple network entities, i.e., pico eNBs, macro eNBs, relay nodes (RNs), and the like, a first network entity (such as the macro eNB) may be used for coverage, handover, initial access, common channel transmission, control plane operation, and the like, while a second network entity (such as the pico eNB) may be used for high throughput data communications. The pico UE may directly report the statistical long-term information to the macro eNB if a connection between pico UE and the macro eNB is established, which is the case for some coordinated multipoint (CoMP) transmissions. Latency incurred by transmitting the statistical long-term information wirelessly to the macro eNB may offset the latency incurred by transmitting the statistical long-term information wirelessly to the pico eNB and then transmitting the statistical long-term information over a backhaul to the macro eNB. The ability to transmit directly to the macro eNB is especially useful in any backhaul, and it may help the macro eNB to better reduce the interference toward the pico UE if lower latency and higher accuracy interference information between the pico UE and the macro eNB is reported via the direct link to the macro eNB.

Although the discussion focuses on pico UEs being victims of interference from macro eNB transmissions, other network entities, such as pico eNBs, may be victims of interference from macro eNB transmissions as well. As an illustrative example, consider a situation where macro eNBs operating as donor eNBs (macro eNBs that allocate a portion of their bandwidth to RNs for use as an over-the-air backhaul) transmit to the RNs. The transmissions may interfere with other donor eNBs and their transmissions. In such a situation, a donor eNB is the interferer (or aggressor) and a RN is the victim. CT may be used to reduce interference to the RNs.

Figure 6:
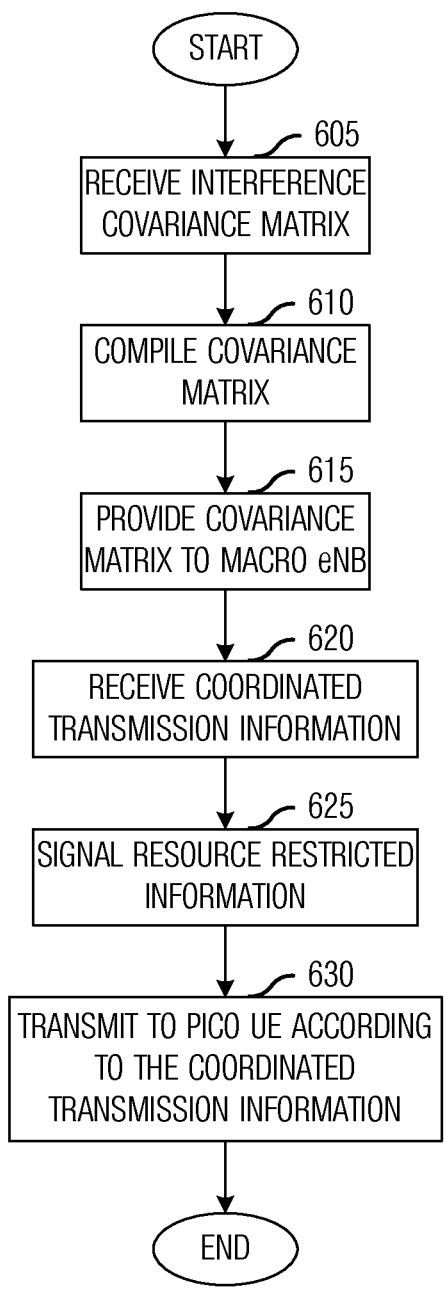
FIG. 6 illustrates an example flow diagram of operations occurring in a pico eNB as the pico eNB communicates with a pico UE and coordinates with a macro eNB to reduce interference according to example embodiments described herein.

FIG. 6 illustrates a flow diagram of operations 600 occurring in a pico eNB as the pico eNB communicates with a pico UE and coordinates with a macro eNB to reduce interference. Operations 600 may be indicative of operations occurring at a pico eNB as the pico eNB communicates with a pico UE and coordinates with a macro eNB to reduce interference caused by the macro eNB to the pico UE.

Operations 600 may begin with the pico eNB receiving channel information from the pico UE regarding an interference channel between the pico UE and an interferer, e.g., the macro eNB (block 605). The channel information may be in the form of an interference covariance matrix $R_{ji}$ where j is an index of the pico UE and i is an index of the macro eNB. Alternatively, the pico eNB may receive measurements (or a function thereof) of the interference channel from the pico UE.

The pico eNB may compile a covariance matrix R from the interference covariance matrix $R_{ji}$ that it received from the pico UEs as well as other pico UEs served by the pico eNB (block 610).

The covariance matrix R reflects an overall spatial subspace and/or direction (i.e., beam) of interference from the interferer (i.e., the macro eNB). The macro eNB may use the covariance matrix R to adjust its precoder to reduce interference in the direction of the pico eNB and the pico UEs.

As an illustrative example of the compilation of the covariance matrix R from the interference covariance matrix $R_{ji}$, consider a situation where the pico eNB is serving 5 pico UEs. The pico eNB receives $R_{ji}$, $CQI_{1,j}$, and $CQI_{2,j}$, j=1, . . . , 5 from the pico UEs. The pico eNB may compute a delta CQI ($\delta$) for each of the pico UEs: $\delta_j := CQI_{2,j}/CQI_{1,j}$ in a linear scale (or $\delta_j := CQI_{2,j} - CQI_{1,j}$ in dB scale). The delta CQI may be used by the pico eNB to weigh the interference covariance matrix $R_{ji}$, as well as a threshold comparison value. In other words, the larger the delta CQI, the greater the weight to be applied to an associated interference covariance matrix $R_{ji}$ to obtain the covariance matrix R. If the delta is less than a threshold, e.g., 1 dB, 2 dB, 3 dB, 4 dB, 5 dB, 6 dB, and the like, the pico eNB may not use the associated interference covariance matrix $R_{ji}$ to obtain the covariance matrix R. The covariance matrix R may be expressed as:

$$R_i = \Sigma_j 1(\delta_j > \delta_{threshold}) \delta_j R_{ji}.$$

It is noted that the use of the threshold ($\delta_{threshold}$) generally excludes pico cell center UEs from contributing to the covariance matrix R. Additionally, the weighting is such that the covariance matrix R reflects the channels to the pico UEs with the most interference (i.e., the pico UEs needing the most assistance with interference reduction or the pico UEs that may receive the most benefit from CT). It is noted that the channel matrix $R_{ji}(k)$ and/or the covariance matrix $R_i$ may be normalized (e.g., to have a unit norm in a certain matrix norm sense), may appropriately incorporate channel strength (such as a coupling loss between the macro eNB and the pico UE), may be appropriately scaled by the long-term and/or average channel strength, or may be appropriately scaled to generally reflect the long-term and/or average channel strength, and the like.

Alternatively, the pico eNB may compile the covariance matrix R from the measurements (or a function thereof) of the interference channels provided by the pico UEs. As an illustrative example of the compilation of the covariance matrix R from the measurements (or a function thereof) of the interference channels, once again consider a situation where the pico eNB is serving 5 pico UEs. The pico eNB receives the measurements (or a function thereof) of the interference channels, $CQI_{1,j}$, and $CQI_{2,j}$, j=1, . . . , 5 from the pico UEs. The pico eNB may compute a delta CQI ($\delta$) for each of the pico UEs: $\delta_j := CQI_{2,j}/CQI_{1,j}$ in a linear scale (or $\delta_j := CQI_{2,j} - CQI_{1,j}$ in dB scale). The delta CQI is used by the pico eNB to weigh the measurements (or a function thereof) of the interference channels, as well as a threshold comparison value. In other words, the larger the delta CQI, the greater the weight to be applied to an associated measurements (or a function thereof) of the interference channels to obtain the covariance matrix R. If the delta is less than a threshold, e.g., 1 dB, 2 dB, 3 dB, 4 dB, 5 dB, 6 dB, and the like, the pico eNB may not use the associated the measurements (or a function thereof) of the interference channels to obtain the covariance matrix R. The covariance matrix R may be expressed as:

$$R_i = \Sigma_j 1(\delta_j > \delta_{threshold}) \delta_j \Sigma_k H_{ji}(k)' H_{ji}(k).$$

It is noted that the channel matrix $H_{ji}(k)$ and/or the covariance matrix $R_i$ may be normalized (e.g., to have a unit norm in a certain matrix norm sense), may appropriately incorporate channel strength (such as a coupling loss between the macro eNB and the pico UE), or may be appropriately scaled by the long-term and/or average channel strength, or may be appropriately scaled to generally reflect the long-term and/or average channel strength, and the like.

The pico eNB may provide the covariance matrix R to the macro eNB (block 615). The pico eNB may make use of a backhaul connection between the pico eNB and the macro eNB. Since the covariance matrix R is statistical long-term information and is relatively small, a low latency and/or high bandwidth backhaul is not required. A high latency and/or low bandwidth backhaul may be sufficient to meet coordination requirements of the example embodiments. It is noted that if a lower latency and/or or higher bandwidth backhaul is available, CT may make use of shorter duration statistical long-term information that may provide higher accuracy to provide improved interference reduction performance. As an example, with a lower latency and/or or higher bandwidth backhaul, the covariance matrix R may be provided to the macro eNB at greater frequency and may include statistical long-term information spanning a shorter time-span, which can provide a more accurate indication of current operating condition in the communications system. It is noted that the transmission of the covariance matrix R to the macro eNB may comprise an implicit request for the macro eNB to perform CT using the covariance matrix R. Alternatively, the pico eNB may also transmit an explicit request to the macro eNB to request the macro eNB to perform CT using the covariance matrix R.

The pico eNB may receive coordinated transmission information from the macro eNB (block 620). The coordinated transmission information may include information about which time-frequency resource(s) the macro eNB will utilize a precoder that has been adjusted (for example, to blank out a portion of its coverage area) according to a precoding constraint to reduce interference to the pico UE(s). The coordinated transmission information may also include a periodicity of the time-frequency resource(s), a duration of the time-frequency resource(s), and the like. Collectively, blocks 615 and 620 may make up a coordination phase of operations 600.

Additionally, the pico eNB may signal the pico UE(s) about patterns for resource-restricted measurements, so that the pico UE(s) may report multiple SINR and/or CQI reports, e.g., one for the reduced interference level and the other for normal interference level (block 625). The signaled resource-restricted measurement pattern may generally be determined from the coordinated transmission information from the macro eNB to the pico eNB. The coordinated transmission information from the macro eNB may be for more than one pico eNBs within the macro eNB coverage area, in which case the pico eNB will extract information pertinent to itself. Alternative the macro eNB may extract information pertinent to each pico eNB and send only the pertinent information to each pico eNB. The pico eNB may transmit to the pico UE(s) in the time-frequency resource(s) and during the duration specified by the macro eNB (in other words, according to the coordinated transmission information) (block 630) based on the SINR and/or CQI report associated with the reduced interference level. The pico eNB may also transmit to the pico UE(s) during the time-frequency resource(s) not specified by the macro eNB (block 630) based on the SINR and/or CQI report associated with the normal interference level. It is noted that the pico eNB may be free to transmit to pico UEs that are not pico cell edge UEs. In other words, the pico eNB may transmit to pico cell center UEs in any time-frequency resource, even those not specified by the macro eNB, and these pico cell center UEs may or may not be configured with resource-restricted measurements. It is also noted that the pico eNB may use a modulation and coding scheme that is designed to be more tolerant of interference to improve immunity to interference when the pico UEs experience the normal interference level.

As discussed previously, instead of reporting the interference covariance matrix $R_{ji}$, the pico UEs may report eigenvector(s) and/or eigenvalue(s). The pico eNB may collect the eigenvector(s) and/or eigenvalue(s) from its pico UEs and compile them into a single direction (i.e., a single vector). The compilation of the eigenvector(s) and/or the eigenvalue(s) may be similar to the example techniques described above for compiling the covariance matrix R. It is noted that if the pico UEs report the measurements (or a function thereof) of the interference channels, the pico eNB may perform the eigenvalue decomposition itself and compile the covariance matrix R from the results.

Figure 7:
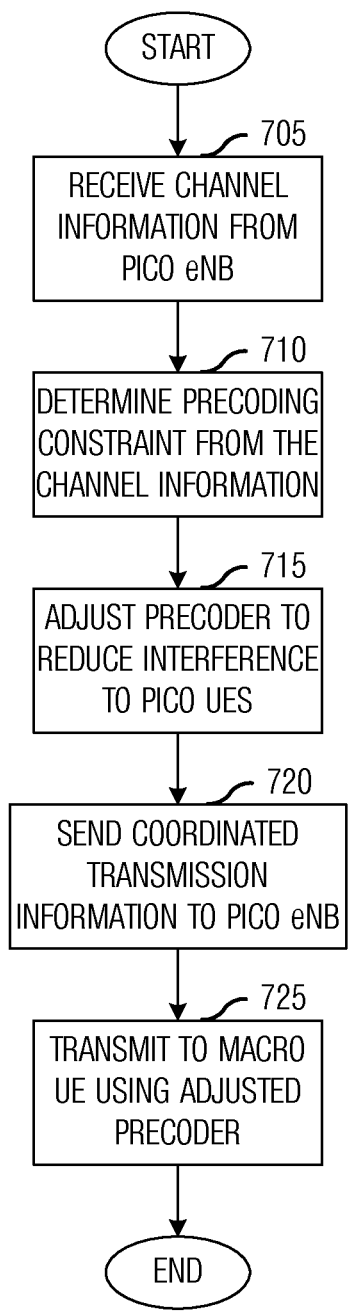
FIG. 7 illustrates an example flow diagram of operations occurring in a macro eNB as the macro eNB operates using CT as it transmits to a served UE according to example embodiments described herein.

FIG. 7 illustrates a flow diagram of operations 700 occurring in a macro eNB as the macro eNB operates using CT as it transmits to a served UE. Operations 700 may be indicative of operations occurring in a macro eNB as the macro eNB operates using CT as it transmits to a served UE. Operating using CT helps to reduce interference to UEs operating in the coverage area of the macro eNB but are served by another eNB, such as a pico eNB or another macro eNB.

Operations 700 may begin with the macro eNB receiving channel information, e.g., a covariance matrix R, from the pico eNB (block 705). The channel information may be for a communications channel between the macro eNB and a pico UE served by the pico eNB. Alternatively, the channel information may be a compilation of spatial information for a plurality of channels between the macro eNB and a plurality of pico UE served by the pico eNB. Alternatively, the macro eNB may receive the channel information directly from the pico UEs. The macro eNB may receive the covariance matrix R over a backhaul link between the macro eNB and the pico eNB. The backhaul link may be a high latency and/or low bandwidth backhaul and still be sufficient to meet coordination requirements of the example embodiments. The covariance matrix R may be received over an uplink control channel and/or derived from an uplink sounding reference signal. Although, in general, the downlink channel may not be same as the uplink channel (except for time division duplex (TDD) cases, for example), the statistical information (such as the covariance matrices) about the downlink channel and uplink channel may be same (or roughly the same, or highly correlated). Therefore, it may be feasible to derive the statistical information about the downlink channel based on an uplink sounding reference signal. It is noted that the receiving of the covariance matrix R from the pico eNB may be an implicit request that the macro eNB perform CT with the covariance matrix R. Alternatively, the macro eNB may receive an explicit request from the pico eNB to perform CT with the covariance matrix R.

The macro eNB may derive a precoding constraint, a time-frequency resource in which the precoding constraint may be applied, and a duration in which the precoding constraint is valid from the channel information (block 710). The precoding constraint may be applied to a precoder in the time-frequency resource and during the duration to adjust the precoder to reduce interference to the pico UE(s). As an example, the precoding constraint may adjust the precoder to blank out a portion of its coverage area to reduce interference to the pico UEs. It is noted that the precoding constraint is a one-way constraint, meaning that the precoding constraint only applies to the macro eNB and its behavior and not to the pico eNB or the pico UE(s). The duration may also include periodicity information, a start time, an end time, a timer, a timer value, an indefinite duration indicator implying that the precoding constraint is to remain valid until updated. The covariance matrix R from the pico eNB may provide the macro eNB directional information about the pico eNB and its associated pico UEs, which may be used by the macro eNB to derive the precoding constraint. The precoding constraint may also include spatial channel information, such as a direction(s) to schedule a transmission to reduce interference to the pico UE(s), direction(s) to avoid or blank out to reduce interference to the pico UE(s), and the like.

It is noted that the pico UEs actually reporting the channel information may not always be the beneficiaries of the reduced interference. As an illustrative example, consider a communications system with a macro eNB serving a first UE. The communications system also includes a pico eNB serving a first pico UE and a second pico UE. The first pico UE may report to the pico eNB channel information about a channel between the macro eNB and itself, which the pico eNB, in turn, reports to the macro eNB. Since the channel information comprises statistical long-term information, when the macro eNB makes use of the channel information to blank out a portion of its transmission coverage area, the first pico UE may no longer be in the same position it was when it made the channel measurements. However, the second pico UE may be. Therefore, the adjustments made by the macro eNB may actually benefit the second pico UE, which did not make the channel measurements nor the reports.

The macro eNB may adjust a precoder used to precode transmissions to macro UEs using the precoding constraint (block 715). The macro eNB may use the precoding constraint to, for example, blank out a portion of its transmission coverage area to reduce interference to the pico UEs. FIG. 3b, discussed previously, provides a high level view of the impact of the adjusted precoder on the coverage area of a macro eNB.

The macro eNB may send coordinated transmission information about the precoding constraint, the time-frequency resource, the duration, and the like, to the pico eNB (block 720). The coordinated transmission information may include information about which time-frequency resource(s) the macro eNB will utilize a precoder to which the precoding constraint has been applied to reduce interference to the pico UE(s). The coordinated transmission information may also include a periodicity of the time-frequency resource(s), a duration of the time-frequency resource(s), a start time, an end time, a timer, a timer value, an indefinite duration indicator implying that the precoding constraint is to remain valid until updated, and the like. The coordinated transmission information may be derived from the covariance matrix R received from the pico eNB. Collectively, blocks 705 through 720 may make up a coordination phase of operations 700. The macro eNB may transmit to a macro UE using the adjusted precoder, in other words, in accordance with the precoding constraint, the time-frequency resource, and the duration (block 725). If the macro eNB is serving a plurality of macro UEs, it may transmit to a subset of the plurality of macro UEs using the adjusted precoder. It is noted that the discussion of the operations occurring in operations 700 are presented in numerical order without any implicit or explicit ordering intended and that the operations may actually occur in different order without impacting the operability of the example embodiments.

As an illustrative example, consider a communications system using single user multiple input multiple output (SU-MIMO) transmission. Let an unadjusted precoder be denoted $W_m$. The adjusted precoder may then be expressed as $R^{-1}W_m$, where $R^{-1}$ is an inverse of the covariance matrix R.

As another illustrative example, consider a communications system using multiple user multiple input multiple output M-MIMO) transmission with zero forcing and two users. Let unadjusted precoders be denoted $W_1$ and $W_2$. Then, after zero forcing but without CT, the adjusted precoders may be expressed as $(W'W)^{-1}W$, where $W=(W_1,W_2)$. However, after zero forcing with CT, the adjusted precoders may be expressed as $(R+W'W)^{-1}W$, or $R^{-1}(W'W)^{-1}W$, or $(V'V)^{-1}V$ where $V=(R^{-1}W_1,R^{-1}W_2)$.

It is noted that active antenna array systems (AAS) may be particularly well suited to CT implementation. The use of AAS to implement CT may result in excellent performance with devices in the blanked out portion of the coverage area receiving almost no interference from the interferer, while devices in the remaining portion of the coverage area receiving a very strong signal.

Instead of blanking a portion of its coverage area according to the statistical long-term information provided by the pico eNBs, the macro eNB may use a sequence of adjusted precoders to blank out portions of its coverage area. The number of adjusted precoders (i.e., length of the sequence), dimension of the blanked out portion of the coverage area, duration of each time-frequency resource, and the like, may be determined by factors such as pico UE and pico eNB distribution, pico UE and pico eNB number, macro UE distribution, macro UE number, and the like.

As an illustrative example, in a first time-frequency resource, the macro eNB may blank out a portion of its coverage area at 20 degrees which may lead to reduced interference in the range of 0 degree to 40 degrees, for example; while in a second time-frequency resource, the macro eNB may blank out a portion of its coverage area at 60 degrees which may lead to reduced interference in the range of 40 degrees to 80 degrees, for example; while in a third time-frequency resource, the macro eNB may blank out a portion of its coverage area at 100 degrees which may lead to reduced interference in the range of 80 degree to 120 degrees, for example; and so on. Once the macro eNB completes the sequence of adjusted precoders, it may repeat the application of the sequence of adjusted precoders or allow a pre-determined number of time-frequency resources to elapse without blanking out any portion of its coverage area and then repeat the application of the sequence of adjusted precoders. The use of a sequence of adjusted precoders generally requires less backhaul transmissions and fewer measurements by the pico UEs.

Figure 8:
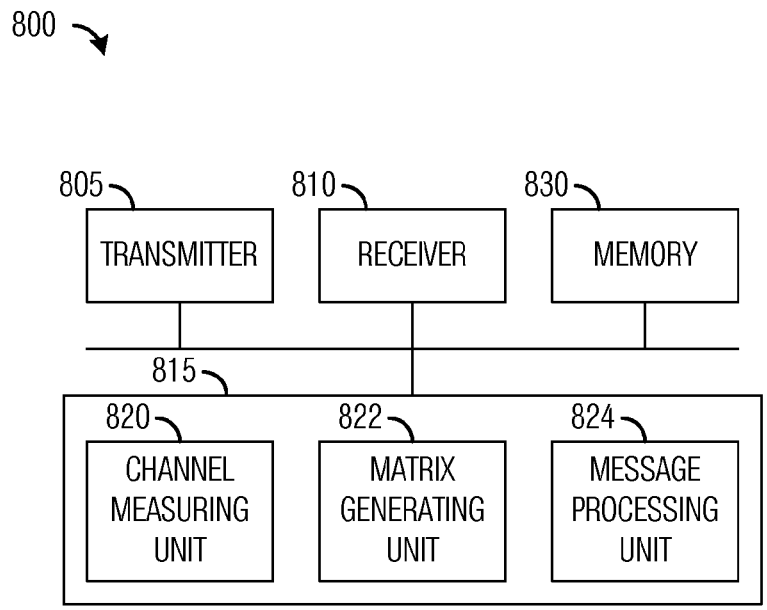
FIG. 8 illustrates an example first communications device according to example embodiments described herein.

FIG. 8 illustrates a diagram of a first communications device 800. Communications device 800 may be an implementation of a victim, such as a pico UE, a pico eNB, a macro eNB, and the like, of a communications system. Communications device 800 may be used to implement various ones of the embodiments discussed herein. As shown in FIG. 8, a transmitter 805 is configured to send statistical long-term information, channel measurements, messages, and the like, and a receiver 810 is configured to receive messages, and the like. Transmitter 805 and receiver 810 may have a wireless interface, a wireline interface, or a combination thereof.

A channel measuring unit 820 is configured to measure a communications channel between communications device 800 and another device. Channel measuring unit 820 measures the communications channel utilizing pilots, reference signals, and/or ordinary transmissions transmitted by the other device. A matrix generating unit 822 is configured to determine an interference covariance matrix from the measurements of the communications channel. A message processing unit 824 is configured to process a message received by communications device 800 and initiate actions in accordance with the received message. A memory 830 is configured to store statistical long-term information, channel measurements, messages, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, transmitter 805 and receiver 810 may be implemented as a specific hardware block, while channel measuring unit 820, matrix generating unit 822, and message processing unit 824 may be software modules executing in a processor 815, such as a microprocessor, a digital signal processor, a custom circuit, or a custom compiled logic array of a field programmable logic array. Additionally, channel measuring unit 820, matrix generating unit 822, and message processing unit 824 may be stored in memory 830.

Figure 9:
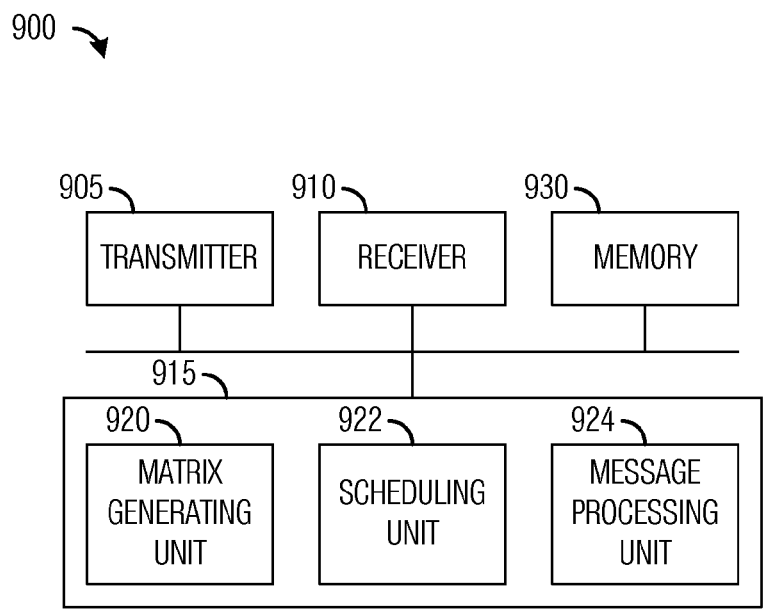
FIG. 9 illustrates an example second communications device according to example embodiments described herein.

FIG. 9 illustrates a diagram of a second communications device 900. Communications device 900 may be an implementation of a network entity, such as a pico eNB, of a communications system. Communications device 900 may be used to implement various ones of the embodiments discussed herein. As shown in FIG. 9, a transmitter 905 is configured to send statistical long-term information, messages, and the like, and a receiver 910 is configured to receive statistical long-term information, channel measurements, messages, and the like. Transmitter 905 and receiver 910 may have a wireless interface, a wireline interface, or a combination thereof.

A matrix generating unit 920 is configured to determine an interference covariance matrix from the measurements of the communications channel. A scheduling unit 922 is configured to schedule transmissions to devices served by communications device 900. A message processing unit 924 is configured to process a message received by communications device 900 and initiate actions in accordance with the received message. A memory 930 is configured to store statistical long-term information, channel measurements, messages, scheduling information, communications data, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while matrix generating unit 920, scheduling unit 922, and message processing unit 924 may be software modules executing in a processor 915, such as a microprocessor, a digital signal processor, a custom circuit, or a custom compiled logic array of a field programmable logic array. Additionally, matrix generating unit 920, scheduling unit 922, and message processing unit 924 may be stored in memory 930.

Figure 10:
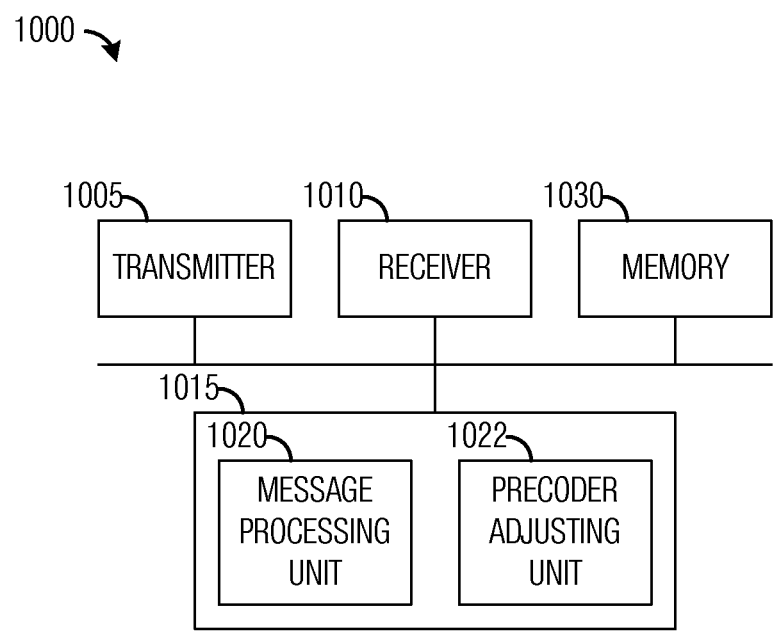
FIG. 10 illustrates an example third communications device according to example embodiments described herein.

FIG. 10 illustrates a diagram of a third communications device 1000. Communications device 1000 may be an implementation of an interferer, such as a macro eNB, of a communications system. Communications device 1000 may be used to implement various ones of the embodiments discussed herein. As shown in FIG. 10, a transmitter 1005 is configured to send messages, and the like, and a receiver 1010 is configured to receive statistical long-term information, channel measurements, messages, and the like. Transmitter 1005 and receiver 1010 may have a wireless interface, a wireline interface, or a combination thereof.

A message processing unit 1024 is configured to process a message received by communications device 1000 and initiate actions in accordance with the received message. Message processing unit 1024 also generates messages to be transmitted by communications device 1000. A precoder adjusting unit 1022 is configured to determine an adjustment for a precoder to be applied to a transmission to blank out a portion of a coverage area of communications device 1000. Precoder adjusting unit 1022 is configured to make use of statistical long-term information provided by other devices to determine the adjustment. Precoder adjusting unit 1022 is configured to apply the adjustment to the precoder to produce the adjusted precoder. A memory 1030 is configured to store statistical long-term information, channel measurements, precoders, precoder adjustments, messages, scheduling information, communications data, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while message processing unit 1020 and precoder adjusting unit 1022 may be software modules executing in a processor 1015, such as a microprocessor, a digital signal processor, a custom circuit, or a custom compiled logic array of a field programmable logic array. Additionally, message processing unit 1020 and precoder adjusting unit 1022 may be stored in memory 1030.

Figure 11:
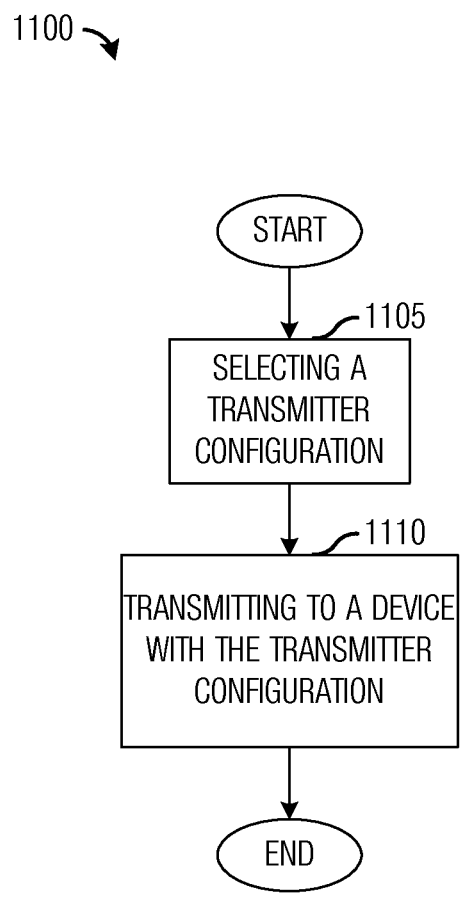
FIG. 11 illustrates an example flow diagram of operations occurring in a communications controller as it reduces interference to devices operating within its coverage area according to example embodiments described herein.

FIG. 11 illustrates a flow diagram of operations 1100 occurring in a communications controller as it reduces interference to devices operating within its coverage area. Operations 1100 may be indicative of operations occurring in a communications controller, such as eNB 105, as the communications controller reduces interference to devices operating within its coverage area.

Operations 1100 may begin with the communications controller selecting a transmitter configuration (block 1105). The communications controller may select a transmitter configuration based on channel information provided by devices operating within its coverage area but are served by other communications controllers. As an example, the devices may be served by pico eNBs, RNs, LPNs, and the like, operating within the coverage area of the communications controller. The channel information is for interference channels between the communications controller and each of a subset of the devices operating within the coverage area of the communications controller.

The transmitter configuration may specify a precoder that the communications controller uses to shape its transmission. As an example, the precoder may shape the transmission so that a portion of the coverage area of the transmission is blanked out to reduce interference to the device(s). FIG. 3b illustrates an example of the effect of an example precoder on the coverage area of a transmission. The transmitter configuration may also specify a time-frequency resource in which the transmission shaped by the precoder will be transmitted, as well as a duration or a time span in which the transmission is to occur.

The communications device may transmit to a device that it is serving in accordance with the transmitter configuration (block 1110). In other words, the communications device shapes the transmission to the device and transmits to the device in the time-frequency resource within the duration.

Although the present disclosure and its advantages have been described in detail, it should be understood that various changes, substitutions and alterations can be made herein without departing from the spirit and scope of the disclosure as defined by the appended claims.

What is claimed is:

1. A method for operating a first communications controller to control a first device so as to minimize interference in a spatial domain, the method comprising:
   receiving, by the first communications controller, channel information for a communications channel between the first communication controller and a second device controlled by a second communications controller, wherein the channel information carries a covariance matrix providing directional information of the second communication controller and the second device;
   determining, by the first communications controller, a precoding constraint in accordance with the covariance matrix, wherein the first communications controller adjusts the precoding constraint in each time-frequency resource to reduce interference in a spatial domain with other devices controlled by the second communications controller;
   transmitting, by the first communications controller, coordinated transmission information about the precoding constraint to the second communication controller; and
   transmitting, by the first communications controller, to the first device in accordance with the precoding constraint.

2. The method of claim 1, wherein the channel information is received from the second communications controller.

3. The method of claim 2, wherein the channel information comprises a request for the first communication controller to perform coordinated transmission in accordance with the channel information.

4. The method of claim 2, wherein the second communications controller controls a plurality of devices including the second device, and wherein the channel information comprises a compilation of spatial information of communications channels between the first communication controller and a subset of the plurality of devices.

5. The method of claim 1, wherein the channel information is received from the second device.

6. The method of claim 5, wherein the channel information is received over an uplink control channel.

7. The method of claim 5, wherein the second device is one of a user equipment, a macro evolved NodeB, or a pico evolved NodeB.

8. The method of claim 1, wherein the precoding constraint blanks out a portion of a transmission coverage area of the first communication controller.

9. The method of claim 1, wherein the first communications controller determines a duration in accordance with the channel information, and the duration comprises at least one of periodicity information, starting time, ending time, a timer, and indefinite duration indicator of validity until a subsequent update of the coordinated transmission information.

10. The method of claim 1, wherein the first communications controller controls a plurality of devices including the first device, and wherein the first communications controller transmits to a subset of the plurality of devices within the time-frequency resource in accordance to the precoding constraint.

11. The method of claim 1, wherein the precoding constraint comprises spatial channel information on which direction the first communication controller schedules a transmission to reduce interference.

12. The method of claim 1, wherein the method further comprises determining the time-frequency resource and a duration of a time period during which the precoding constraint is valid in accordance with the received channel information, the precoding constraint occurring within the time-frequency resource for the duration to reduce interference to at least one of the second device and a subset of the other devices controlled by the second controller.

13. The method of claim 1, wherein the second device and at least one of the other devices are a same type of device.

14. A first communications controller to control a first device so as to minimize interference in a spatial domain, the first communications controller comprising:
   a receiver configured to receive channel information for a communications channel between the first communication controller and a second device controlled by a second communications controller, wherein the channel information carries a covariance matrix providing directional information of the second communication controller and the second device;
   a processor operatively coupled to the receiver, the processor configured to determine a precoding constraint in accordance with the covariance matrix, wherein the first communications controller adjusts the precoding constraint in each time-frequency resource to reduce interference with other devices controlled by the second communications controller; and
   a transmitter operatively coupled to the processor, the transmitter configured to transmit coordinated transmission information about the precoding constraint to the second communication controller, and to transmit to the first device in accordance with the precoding constraint.

15. The first communications controller of claim 14, wherein the receiver is configured to receive the channel information from the second communications controller.

16. The first communications controller of claim 14, wherein the receiver is configured to receive the channel information from the second device.

17. The first communications controller of claim 16, wherein the receiver is configured to receive the channel information over an uplink control channel.

18. The first communications controller of claim 15, wherein the processor is configured to derive the channel information in accordance with an uplink sounding reference signal received from the second device.

19. The first communications controller of claim 14, wherein the processor is configured to use the precoding constraint to blank out a portion of a transmission coverage area of the first communications controller.

20. The first communications controller of claim 14, wherein the first communications controller controls a plurality of devices including the first device, and wherein the transmitter is configured to transmit to a subset of the plurality of devices within the time-frequency resource in accordance to the precoding constraint.

21. The first communications controller of claim 14, wherein the second communications controller controls a plurality of devices, and wherein the processor is configured to determine the time-frequency resource, a duration in accordance with the received channel information, the precoding constraint for use with the transmission of the first communications controller occurring within the time-frequency resource for the duration to reduce interference to a subset of the plurality of devices.

22. The first communications controller of claim 15, wherein the channel information comprises a request for the first communication controller to perform coordinated transmission in accordance with the channel information.

23. The first communications controller of claim 15, wherein the second communications controller controls a plurality of devices including the second device, and wherein the channel information comprises a compilation of spatial information of communications channels between the first communication controller and a subset of the plurality of devices.

24. The first communications controller of claim 16, wherein the second device is one of a user equipment, a macro evolved NodeB, and a pico evolved NodeB.

25. The first communications controller of claim 14, wherein a duration comprises at least one of periodicity information, starting time, ending time, a timer, and indefinite duration indicator of validity until a subsequent update of the coordinated transmission information.

26. The first communications controller of claim 14, wherein the precoding constraint comprises spatial channel information on which direction the first communication controller is configured to schedule a transmission to reduce interference.

27. The first communications controller of claim 14, wherein the second device and at least one of the other devices are a same type of device.

28. The first communications controller of claim 14, wherein the first communications controller adjusts the precoding constraint in each time-frequency resource until interference is eliminated.

* * * * *